May 28, 1929.　　　W. E. HALE　　　1,715,003

AUTOMATIC BRAKE

Filed April 24, 1926

WITNESS:
Robt R Kitchel

INVENTOR
William E. Hale
BY
Augustus B. Stoughton
ATTORNEY

Patented May 28, 1929.

1,715,003

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

AUTOMATIC BRAKE.

Application filed April 24, 1926. Serial No. 104,304.

The principal object of the present invention is to automatically apply a band braking effect of relatively large magnitude to a drum revolved in one direction and to automatically apply a band braking effect of relatively small or perhaps even negligible magnitude when the drum is revolved in the other direction.

Other objects of the invention will appear from the following description at the end of which the invention will be claimed.

Figure 1:
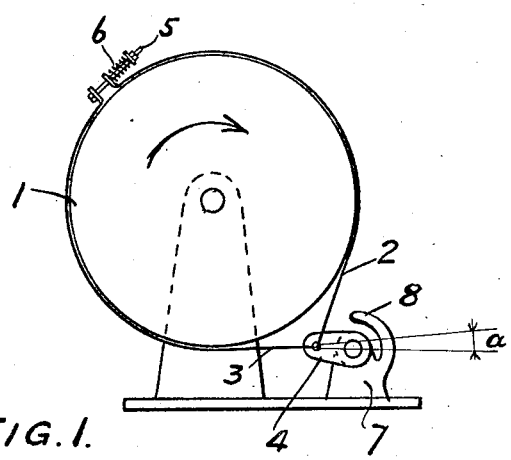
Figure 2:
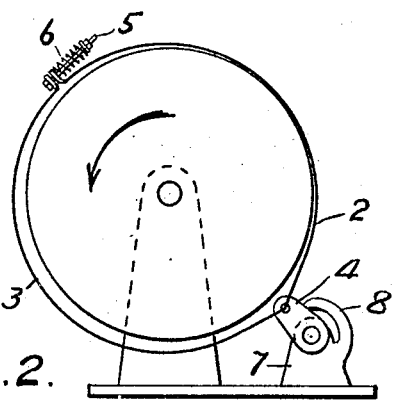

In the following description reference will be made to the accompanying drawing forming part hereof and in which Figures 1 and 2 are more or less diagrammatic elevational views of automatic brake mechanism embodying features of the invention and illustrating the position of the parts thereof when the drum is run or turned in opposite directions.

In the drawing 1 is a brake drum surrounded by brake band sections 2 and 3 each having one end fastened to a pivoted arm 4 and the other ends connected together by a bolt 5 on which is mounted a spring 6. The pivoted arm 4 is mounted upon a bearing member 7 and has its motion restrained in one direction by a stop 8. The brake band and the pivotally supported arm are hinged together.

When the brake drum 1 is turned in clockwise direction, as shown in Fig. 1, the brake band is carried around in the same direction as the drum, bending the hinge and coming into closer contact with the drum, with the result that the pivoted member 4 is moved into such position that the angle $a$ is reduced until the forces acting through 4, 2 and 3 are in equilibrium with $\frac{a}{b}$ equal to the ratio fixed by the well known laws of friction.

Referring to Fig. 2, which shows the drum revolving in anti-clockwise direction, the hinge between the brake band and the arm 4 is straightened and its motion restrained by the stop 8 at a position where the brake band is in maximum slack position.

When the drum revolves in one direction the brake band is applied as a brake of a magnitude or amount fixed by the design and elasticity of the parts used and if desired adjustable in magnitude by means of a variable elastic member 6, and when the drum revolves in a reverse direction the braking effort is small, being produced only through the weight of the brake bands or other parts resting upon the drum which weight can be reduced to a minimum, this minimum being that required to produce effort enough to move the mechanism from the operating position in one direction to the operating position in the other direction. In other words, it is the friction due to the weight of the brake band when the drum is running that shifts the parts from the positions shown in Fig. 2 to the positions shown in Fig. 1 when the direction of turning movement of the drum is reversed.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. An automatic brake including a brake band and a pivotally supported bar hinged together, a drum in the brake band and adapted by friction on the band when turned in one direction to bend said hinge and tighten the band and when turned in the other direction to straighten said hinge and slacken the band said band constituting the sole connection between the drum and the bar, and a stop for limiting the straightening movement of the hinge.

2. An automatic brake comprising a sectional brake band including an elastic member, a pivotally supported bar hinged to the ends of said band, a drum in the brake band and adapted when turned in one direction to bend said hinge and tighten the band and when turned in the other direction to straighten said hinge and slacken the band, and a stop for limiting the straightening movement of the hinge.

WILLIAM E. HALE.